United States Patent Office 3,738,852
Patented June 12, 1973

3,738,852
CATIONIC BITUMINOUS EMULSION
Tadashi Doi, Shunzo Ohtsuka, and Sumio Arai, Wakayama, Japan, assignors to Kao Soap Co., Ltd., Tokyo, Japan
No Drawing. Continuation-in-part of application Ser. No. 744,700, July 15, 1968. This application May 17, 1971, Ser. No. 144,329
Claims priority, application Japan, July 19, 1967, 42/46,473
Int. Cl. C08h *13/00;* C08k *1/622;* C09d *3/24*
U.S. Cl. 106—277    5 Claims

ABSTRACT OF THE DISCLOSURE

An asphalt-in-water emulsion in which there is an emulsifier comprised of a mixture of a water-soluble salt of a monoamine having a long chain alkyl or alkenyl group of 8 to 22 carbon atoms and a water-soluble salt of a triamine having a long chain alkyl or alkenyl group of 8 to 12 carbon atoms.

CROSS-REFERENCE TO RELATED APPLICATION

This application is a continuation-in-part of our copending application Ser. No. 744,700, filed July 15, 1968, now abandoned.

BACKGROUND OF THE INVENTION

Field of the invention

This invention relates to a novel cationic bituminous emulsion. Specifically, it relates to an asphalt-in-water emulsion which is produced by emulsifying asphalt, as the dispersed phase, and water, as the continuous phase, using as a novel emulsifier composition a mixture of a water-soluble salt of a long chain alkyl or alkenyl monoamine and a water-soluble salt of a long chain alkyl or alkenyl triamine having three basic nitrogen atoms. In the present invention, the long chain alkyl or alkenyl group contains from 8 to 22 carbon atoms. The bituminous emulsion according to the present invention can be used for ground fixation and impermeabilization toward water by injection of the emulsion into loose soils or sub-soils, such as sand, in which the emulsion breaks after the emulsion has penetrated through the soil formation and is in place. An emulsion for such use will be called a "penetration asphalt emulsion" hereinbelow. Further, the bituminous emulsion according to the present invention can be used for coating and surfacing materials used in the construction of, for example, roads, airport runways and ground surfaces by mixing same as binders with aggregates. An emulsion for such use will be called a "mixing asphalt emulsion" hereinbelow.

Description of the prior art

Cationic bituminous emulsions have recently come to be generally and extensively used in place of the conventionally used anionic bituminous emulsions. As the emulsifiers for cationic penetration asphalt emulsions, there have been used alkylpropylenediamine salts such as tallowpropylenediamine and stearylpropylenediamine, alkyl substituted imidazoline salts such as 1-aminoethyl-2-heptadecenyl-2-imidazoline and 1-amino-2-heptadecyl-2-imidazoline and quaternary ammonium salts such as stearyltrimethylammonium chloride and oleyltrimethylammonium chloride. Further, as the emulsifiers for cationic mixing asphalt emulsions, there are known aminated lignin and polyoxyethylene tallowpropylenediamine.

Emusifiers for use in mixing asphalt emulsions should have such features that they can be well mixed with the required amount of the aggregate, that the produced emulsion does not flow out of the carrier while it is being carried to the desired place, that the emulsifier can give the aggregate mixture a viscosity sufficient to prevent the fine aggregate and coarse aggregate from being separated from each other by vibration during transportation, that the viscosity is not influenced too much by the water content in the aggregate and that the emulsion in the mixture does not decompose to lose its workability during the road paving operation. However, conventional emulsifiers for mixing asphalt emulsions such as are mentioned above have been insufficient to give such desired properties to the emulsion.

The object of the present invention is to remedy these disadvantages and to provide a novel and excellent emulsifier composition for penetration and mixing asphalt emulsions.

SUMMARY OF THE INVENTION

It has been found that a mixing asphalt emulsion prepared by emulsifying water and asphalt with a mixture of a water-soluble salt of a long chain alkyl or alkenyl monoamine and a water-soluble salt of a long chain alkyl or alkenyl triamine having three basic nitrogen atoms show advantageous features, not present in conventional mixing asphalt emulsions, namely, that the variety of the emulsion will not be so much influenced by the water content in the aggregate mixture, it will completely break even in winter, it will be well mixed with aggregates irrespective of the quality of the stones in the aggregate and it will coat very effectively the aggregate so that the asphalt film coated on the aggregate cannot be stripped.

For the long chain alkyl or alkenyl (8–22 C) primary monoamine salts to be used in the present invention there can be enumerated, for example, salts, such as the hydrochloric acid and acetic acid salts, of octylamine, laurylamine, myristylamine, palmitylamine, stearylamine, oleylamine, tallowamine and behenylamine. Further, the long chain alkyl or alkenyl (8–22 C) triamine salts having three basic nitrogen atoms to be used in the present invention include, for example, salts, such as the hydrochloric acid and acetic acid salts, of 1-tallowdipropylene-1,3,6-triamine, bisaminopropyl tallowamine, 1-octyldipropylene-1,3,6-triamine, bisaminopropyloctylamine, 1-behenyldipropylene-1,3,6-triamine and bisaminopropylbehenylamine.

Thus, according to the invention there is used a mixture of a primary monoamine of the formula $$RNH_2$$

and a triamine of the formula $$R'N-(CH_2)_nNH(CH_2)_nNH_2 \text{ or } R'N\begin{matrix}(CH_2)_nNH_2\\ \\(CH_2)_nNH_2\end{matrix}$$
$$|\\H$$

In the foregoing formula, $n$ is an integer from 2–3 and R and R' each is an alkyl or alkenyl containing from 8 to 22 carbon atoms. R and R' will usually be derived from natural fatty acids or mixtures thereof. For example, R and R' may be tallow of the following composition

| | C14 | C16 | C18 | C18 (F) | C18 (FF) |
|---|---|---|---|---|---|
| Composition, percent (by wt.) | 2–8 | 24–32 | 14–28 | 39–50 | 1–5 |

NOTE.—F indicates one double bond in the radical; FF indicates two double bonds in the radical.

The mixing ratio of (a) the monoamine salt to (b) the triamine salt, in the emulsifier composition, is in the range of a:b=1:9 to 7:3 parts by weight, preferably in the range of a:b=5:5 to 6:4.

In preparing the asphalt emulsion, an emulsifying solution should be first prepared by adding to water, a predetermined amount of the mixture consisting of the above-mentioned long chain alkyl or alkenyl monoamine and the long chain alkyl or alkenyl triamine having three basic nitrogen atoms, a suitable acid, such as hydrochloric acid or acetic acid, is added to convert the amines to their water-soluble salts by adjusting the pH of the solution properly (so as to be about 6.0 with acetic acid or about 2.7 with hydrochloric acid). The particular acid used is not critical and other acids such as nitric, phosphoric, etc., can be used. The total amount of the amine mixture added should be adjusted to be in the range of 0.15 to 2.0% by weight, based on the weight of the final asphalt emulsion product.

If desired, calcium chloride can be added to the emulsifying solution in an amount in the range of 0.1 to 0.5% by weight based on the weight of the final asphalt emulsion product. Calcium chloride is an optional ingredient of the final asphalt emulsion product according to the present invention. It is customarily used in cationic bituminous emulsions to increase the storage stability of the emulsions and, to some extent, to reduce the viscosity thereof.

Then this emulsifying solution together with asphalt are passed simultaneously through an emulsifying apparatus, such as a colloid mill, to prepare the final asphalt emulsion product. At the time of the emulsification, the temperature of the asphalt is preferably 110 to 150° C. and that of the emulsifying solution is preferably 40 to 80° C. More preferably, the temperature of the asphalt is 120 to 140° C. and that of the emulsifying solution is 60 to 70° C.

The final asphalt emulsion product contains from about 50% to about 70% by weight of asphalt.

Thus, the final asphalt emulsion product according to the invention consists essentially of the following composition:

Asphalt: 50–70% by weight
Amine mixture: 0.15–2.0% by weight
Water: Balance to 100%

In addition, the final asphalt emulsion product may contain, as optional ingredients, from 0.1–0.5% by weight of calcium chloride, as aforesaid, and 0.1 to 10% by weight of the below-mentioned water-soluble non-ionic or cationic polymer or nonionic surface active agent.

Conventional asphalts having a penetration degree in the range of 40 to 300, at 25° C. under a load of 100 grams applied for 5 seconds, are suitable for the purposes of the present invention.

The final asphalt emulsion product prepared according to the present invention can be mixed with aggregates by a conventional plant mixing system. Further, since the speed of the breaking of the final asphalt emulsion prepared according to the present invention can be varied by adjusting the concentration of the emulsion used, as exemplified in the following examples, the emulsion can be very suitably used even for preparing road pavement compositions by a road mixing system, in which it is desirable for the emulsion in the mixture to break relatively quickly.

Further, if required, in order to delay the breaking of the emulsion in the mixture, 0.1 to 10% by weight, based on the weight of the final asphalt emulsion product, of a water-soluble non-ionic or cationic high polymer, such as a cellulose derivative such as methylcellulose or hydroxyethyl cellulose, polyvinyl alcohol, polyethyene gycol, polyvinyl pyridine and polythiourea or a non-ionic surface active agent such as polyoxyethylene alkylphenyl ether or mixtures thereof may be added.

An exemplified also in the examples, the emulsifying agent composition to be used in the present invention can accomplish a sufficient effect when a smaller amount is used as compared with the amounts of commercial emulsifiers normally used in a penetration asphalt emulsion. Also, the emulsifier according to the present invention can provide excellent and economical cationic bituminous emulsions.

DESCRIPTION OF THE PREFERRED EMBODIMENTS

The present invention shall be further explained with reference to the following examples:

EXAMPLE 1

1-hardened tallow dipropylene, 3,6-trimaine and hardened tallowamine were mixed at a ratio of 6:4 by weight and hydrochloric acid was added to a predetermined amount of aqueous solutions, of various concentrations, of this amine mixture to substantially neutralize the amines by adjusting the pH of the solution to be about 2.7. Emulsifying solutions were prepared with, and without, adding calcium chloride to said aqueous emulsifier solutions.

Asphalt emulsion specimens were prepared by simultaneously passing through a colloid mill 45 parts of the emulsifying solutions warmed to 70° C. and 55 parts of the molten asphalt at a temperature of 120° C. The performances of the produced emulsions were tested as compared with those emulsions prepared in exactly the same manner but using various commercial emulsifiers. The results are shown in Table 1.

Table 1 shows that the emulsifier composition according to the present invention can accomplish an excellent effect even when used in an amount much smaller than when any commercial emulsifier is used.

TABLE 1

| Kind of asphalt | Kind of emulsifier | Emulsifier concentration [1] | | | | | | | | | | | |
|---|---|---|---|---|---|---|---|---|---|---|---|---|---|
| | | 0.15% | | | | 0.20% | | | | 0.25% | | | |
| | | Calcium chloride concentration [1] | | | | | | | | | | | |
| | | 0.3% | | | | 0.3% | | | | 0.25% / 0% | | | |
| | | Property items | | | | | | | | | | | |
| | | Settlement test in percent (1) | Engler viscosity (2) | Evaporation residue in percent (3) | Sieve test in percent (4) | Settlement test in percent (1) | Engler viscosity (2) | Evaporation residue in percent (3) | Sieve test in percent (4) | Settlement test in percent (1) | Engler viscosity (2) | Evaporation residue in percent (3) | Sieve test in percent (4) |
| Asphalt of penetration 130 to 200 (Kuwait crude oil) | Emulsifier mixture in Example 1 | 2.5 | 2.8 | 65.0 | 0 | 5.2 | 4.6 | 55.7 | 0 | 1.0 | 6.2 | 56.4 | 0 |
| | 1-aminoethyl-2-heptadecenyl-imidazoline | 30.2 | 2.0 | 55.2 | 0 | 28.3 | 2.1 | 56.1 | 0 | | | | |
| | Stearyl trimethyl ammonium chloride | 20.3 | 2.6 | 55.8 | 0 | 13.6 | 2.8 | 56.2 | 0 | 10.2 | 2.9 | 56.2 | 0 |
| | Oleoalkyl propylenediamine | 19.2 | 2.5 | 55.9 | 0 | 14.7 | 2.5 | 55.9 | 0 | 8.7 | 2.4 | 56.6 | 0 |
| Asphalt of penetration 180 to 200 (Kafuji crude oil) | Emulsifier mixture in Example 1 | 3.5 | 3.2 | 57.0 | 0 | 0.3 | 4.8 | 55.3 | 0 | 0.1 | 5.4 | 56.3 | |
| | Oleoalkyl propylenediamine | 7.8 | 2.8 | 55.4 | 0 | 6.7 | 2.5 | 55.5 | 0 | 4.5 | 2.6 | 55.8 | 0 |

[1] In percent by weight based on the asphalt emulsion.

EXAMPLE 2

An amine mixture solution was prepared by mixing bisaminopropyl hardened tallowamine and hardened tallowamine at a mixing ratio of 6:4 by weight. Acetic acid was added to the solution to adjust the pH to about 6.0. Calcium chloride was added to the solution to obtain the emulsifier solution. An asphalt emulsion was obtained in the same manner as in Example 1 by using said emulsifying solution. The performance of the asphalt emulsion thus obtained was substantially the same as that of the emulsion in Example 1.

EXAMPLE 3

Emulsifying solutions were prepared by adding calcium chloride, methylcellulose, polyvinyl alcohol, polyvinyl pyridine and polyoxyethylene nonylphenyl ether, respectively, in the amounts shown in Table 2 to an aqueous solution which had been prepared by adjusting the pH to be about 2.7 by adding hydrochloric acid, to a predetermined amount of an amine mixture prepared by mixing 1-hardened tallow dipropylene, 3,6-triamine and hardened tallowamine at a ratio of 6:4 by weight. Asphalt emulsions were prepared by simultaneously passing through a colloid mill 43 parts of the respective emulsifying solutions warmed to 70° C. and 57 parts of fluxed asphalt (obtained from Kuwait crude oil having a penetration of 180 to 200) at a temperature of 120° C. The performances of the produced emulsion were tested as compared with those of emulsions prepared in exactly the same manner but using commercial emulsifying agents. The results are shown in Table 2.

The emulsifiers used in the controls were as follows:
Control 1: Tallowpropylenediamine.
Control 2: Stearyltrimethylammonium chloride.
Control 3: N' dipolyethenoxy, N polyethenoxy and N hardened tallowpropylenediamine (P=10).
Control 4: N' dipolyethenoxy, NN' polyethenoxy, N hardened tallowdipropylene and 1,3,6-triammonium trichloride (P=10).
Control 5: Aminated lignin.

The measurements of (1) Settlement test, (2) Engler viscosity, (3) Evaporation residue and (4) Sieve test in Tables 1 and 2 were made according to the methods defined in JIS (Japanese Industrial Standard) K2208—1967 (Emulsified asphalt). They are digested as follows:

(1) Settlement test.—This test is intended to test the stability of the emulsion during storage.

(1) Apparatus

1.—Cylinders for settlement test: 250-ml. glass cylinders equipped with two outlet tubes and a mark line of 250 ml.

2.—Containers for evaporation residue: Metal evaporation cans about 90 mm. in inside diameter, about 120 mm. in height and 0.5 to 1 mm. in wall thickness.

(2) Procedure and reporting test results

Pour 250 ml. of the sample into the cylinder and allow to stand at room temperature for five days with a rubber or cork stopper fitted therein. After the expiration of the period, take out 50 g. (approximately) of the sample from the upper outlet tube, without disturbing the balance of the contents, into a container as described above. Then discharge the middle layer of the sample through the lower outlet tube and discard it. Thoroughly stir the sample remaining below in the cylinder and take out the remaining sample into another container with the cylinder inclined. Weight each container accurately to the nearest 0.2 g. Determine the evaporation residues (percent) of the upper layer and bottom layer of the sample and the difference between the test results for the bottom and upper layer shall be taken as the settlement (percent).

(2) Engler viscosity.—This test is intended to ascertain whether the emulsion has a satisfactory viscosity when it is spread on or mixed with aggregates and the viscosity of the emulsion is measured by using an Engler Viscosimter.

(3) Evaporation residue.—This test is intended to determine the evaporation residue obtained by evaporating water in the emulsion.

(1) Apparatus

1.— Evaporating cam: A metallic can about 100 mm. in diameter, about 188 mm. in height and 0.5 to 1 mm. in wall thickness.

2.—Thermometer, with maximum reading 360° C. and graduated in single degrees.

(2) Procedure and reporting test results

Weigh accurately about 200 g. of the sample in the evaporating can to the nearest 1 g. and apply heat by means of an electric heater or gas burner. Continue the heating successively for about one minute at 160° C. after almost all of the water in the emulsion is evaporated off. Weigh the evaporating residue (g) after heating, calculate its percentage against the weight of the sample (g) taken and round off the result to the nearest integer.

(4) Sieve test.—This test is intended to test whether the asphaltic particles in the emulsion are coarse or lumpy.

(1) Apparatus

1.—Sieve: A wire-gauze sieve of mesh size 1190μ, the frame of which is about 75 mm. in diameter and 20 mm. in depth.

2.—Dish, made of metal or glass with diameter larger than that of the sieve bottom.

(2) Procedure and reporting test results

Weigh accurately both the sieve and dish to the nearest 0.5 g. After the sieve net is moistened thoroughly with distilled water, weight 500±5 g. of the sample into a beaker and pour onto the sieve. Thoroughly wash the beaker and the residue retained on the sieve with distilled water until the color of the emulsion is no longer perceptible, pouring the washings of the beaker also onto the slieve. Then place the sieve with residue on the dish and dry for 2 hours in an air oven maintained at 105 to 110° C., allowed to cool to room temperature and weigh. Subtract the added weight of the sieve and dish from the total weight of the sieve, dish and residue on the sieve and the difference shall be taken as "the residue on the sieve (g)". Calculate the amount of the residue in percentage and round off the value to the first decimal place.

(5) Mixing with aggregate having dense texture.—This test is intended to test the miscibility of the emulsion with aggregate having dense texture when used in pavement construction.

(1) Apparatus

1.—Dish: A round bottomed metal dish, 100 ml. in capacity.

2.—Spatual: A metallic spatula, about 220 mm. in length.

(2) Procedure and reporting test results

Weigh on the dish 250±1 g. of the crushed stone (5 to 2.5 mm. in size), 180±1 g. of river sand (passing through a 590μ sieve and retained on a 149μ sieve) and 15±0.5 g. of limestone dust (passing through a 74μ sieve). Mix with 20±0.5 g. of water to form a homogeneous composition. Immediately add 55±0.5 g. of the sample kept at room temperature and mix with the spatula for 3 minutes at a rate of about 60 times per minute. Examine the condition of the mixture. If the mixture is homogeneous, the sample shall be considered to pass this test.

(6) Pug mill mixing test

| Aggregate particles size in mm.: | In percent by weight |
|---|---|
| 20–13 | 17.5 |
| 13–5 | 35 |
| 5–2.5 | 17.5 |
| 2.5–0.6 | 13.5 |
| 0.6–0.3 | 6.3 |
| 0.3–0.15 | 4 |
| 0.15–0.07 | 3.5 |
| Less than 0.07 | 2.5 |

9% by weight of each emulsion was mixed into each of the aggregate compositions having the size distribution shown in the above table by using a plug mill. The sand used therein has been obtained in the River Yoshino.

O: There was a workability after a lapse of 6 hours after mixing.

Δ: There was a workability after a lapse of 3 hours after mixing.

X: The emulsion decomposed and mixing was impossible or, even when it was possible, the workability was soon lost.

Table 2 hows that the emulsion according to the present invention shows much superior properties as a mixing asphalt emulsion to those of the emulsions prepared by using commercial emulsifiers.

EXAMPLE 4

An asphalt emulsion was obtained by adjusting to a pH of 6.0, by adding acetic acid, an amine mixture solution prepared by mixing bisaminopropyl hardened, tallowamine and hardened tallowamine in a mixing ratio of 6:4 by weight and then emulsifying the solution by the same method as in Example 1. The properties and performances of the emulsion were substantially the same as of the emulsion of the present invention in Example 3.

EXAMPLE 5

A series of experiments were carried out for the purpose of comparing mixtures of alkyl monoamine and alkyltriamine with mixture of alkyl monoamine and alkyldiamine as emulsifiers for use in mixing asphalt emulsions.

(5) Kinds of emulsifiers used
a. Mixing ratios (parts by weight) of monoamine and triamine

| Monoamine (I) [1] | 10 | 9 | 8 | 7 | 6 | 5 | 4 | 3 | 2 | 1 | 0 |
|---|---|---|---|---|---|---|---|---|---|---|---|
| Triamine (II) [2] | 0 | 1 | 2 | 3 | 4 | 5 | 6 | 7 | 8 | 9 | 10 |

[1] Monoamine (I): Hardened tallowamine.
[2] Triamine (II): Hardened tallowdipropylenetriamine.

b. Mixing ratios (parts by weight) of monoamine and diamine

| Monoamine (III) [3] | 10 | 9 | 8 | 7 | 6 | 5 | 4 | 3 | 2 | 1 | 0 |
|---|---|---|---|---|---|---|---|---|---|---|---|
| Diamine (IV) [4] | 0 | 1 | 2 | 3 | 4 | 5 | 6 | 7 | 8 | 9 | 10 |

[3] Monoamine (III): Tallowamine.
[4] Diamine (IV): Tallowpropylenediamine.

Preparation of asphalt emulsions

Formulation of asphalt emulsion

| | Parts by weight |
|---|---|
| Asphalt (Pen 180/200) | 55 |
| Water | 45 |
| Emulsifier | 0.3 |
| 35% hydrochloric acid | 0.25 |
| $CaCl_2 \cdot 2H_2O$ | 0.3 |

Asphalt in the above amount was melted by heating at 120° C. Emulsifying solutions were prepared by mixing water, the above-named emulsifiers, 35% hydrochloric acid and $CaCl_2 \cdot 2H_2O$ in the amounts shown above, to form solutions. Asphalt emulsions were prepared by simultaneously passing through a colloid mill the respective emulsifying solutions warmed to 70° C. and the above molten asphalt at a temperature of 120° C.

Testing method

Settlement and Engler viscosity tests were carried out by the above-described procedures. In addition there was carried out a freezing test to determine the stability of the emulsions when stored at a temperature lower than 0° C. in cold season.

Apparatus
Sample container: A metallic container capable of being tightly closed, about 45 mm. in inside diameter, about 70 mm. in height and 0.5 to 1 mm. in wall thickness.
Cooling apparatus capable of maintaining a temperature of $-5° \pm 0.5°$ C.

Further, a spraying test was carried out to test the workability of the emulsion.

180 kg. (1 drum) of the asphalt emulsion is sprayed by means of an emulsion spraying machine provided with 2 HP gear pump. The workability of the emulsion was evaluated by the time which was required for completing the spraying of 180 kg. of the emulsion. The longer this time is, the poorer is the workability of the emulsion.

Test results

On the asphalt emulsions prepared by employing emulsifiers consisting of various monoamine-triamine and monoamine-diamine mixtures, as listed above, various properties of the emulsions were measured. The test results are summarized in the following table:

| | (a) Monoamine plus Triamine | | | | | | | | | | |
|---|---|---|---|---|---|---|---|---|---|---|---|
| | Emulsifier—Monoamine (I) | | | | | | | | | | |
| | 10 | 9 | 8 | 7 | 6 | 5 | 4 | 3 | 2 | 1 | 0 |
| | Emulsifier—Triamine (II) | | | | | | | | | | |
| Properties measured | 0 | 1 | 2 | 3 | 4 | 5 | 6 | 7 | 8 | 9 | 10 |
| Settlement (percent) | 5.3 | 6.8 | 1.3 | 0.8 | 0 | 0 | 0 | 0 | 0 | 0 | (¹) |
| Engler viscosity | 2.3 | 2.6 | 3.3 | 3.6 | 4.5 | 6.2 | 7.2 | 7.9 | 9.8 | 10.6 | |
| Freezing test | Did not pass the test | | | Pass the test | | | | Did not pass the test | | | |
| Spraying test (min.) | 4 | 3.5 | | | 3.5 | 4.5 | | 7 | Need more than 7 min. and cannot finish the spraying. | | |

(b) Monoamine plus Diamine

| Properties measured | Emulsifier—Monoamine (III) | | | | | | | | | |
|---|---|---|---|---|---|---|---|---|---|---|
| | 10 | 9 | 8 | 7 | 6 | 5 | 4 | 3 | 2 | 1 | 0 |
| | Emulsifier—Diamine (IV) | | | | | | | | | |
| | 0 | 1 | 2 | 3 | 4 | 5 | 6 | 7 | 8. | 9 | 10 |
| Settlement (percent) | 14.7 | 13.1 | 12.0 | 5 | 2 | 0 | 0 | 0 | 0 | (²) | (¹) |
| Engler viscosity | 2.5 | 2.9 | 4.0 | 8.7 | 13.2 | 14.4 | 13.7 | 15.8 | 15.8 | | |
| Freezing test | Did not pass the test | | | | | | | | | |
| Spraying test (min.) | 4.5 | 6 | 7 | Need more than 7 min. and cannot finish the spraying. | | | | | | |

¹ Did not emulsify.
² Emulsify but separate on standing.

From the above test results, it is noted that the monoaminetriamine system provides (1) better storage stability of the emulsion represented by the settlement (percent) and better low temperature stability of the emulsion measured by the freezing test, (2) the viscosity of the asphalt emulsion does not increase rapidly and (3) better workability of the asphalt emulsion represented by the spraying test, as compared with the use of the monoamine-diamine system.

The embodiments of the invention in which an exclusive property or privilege is claimed are defined as follows:

1. A cationic bituminous emulsion consisting essentially of
   (I) from 50 to 70 percent by weight of asphalt, as the dispersed phase;
   (II) from about 0.15 to about 2.0 percent by weight of an emulsifier consisting essentially of a mixture of
      (a) hydrochloric acid salt or acetic acid salt of primary monoamine of the formula $RNH_2$, wherein R is alkyl or alkenyl having from 8 to 22 carbon atoms, or mixtures thereof
      (b) hydrochloric acid salt or acetic acid salt of triamine of the formula

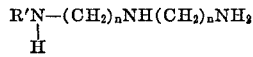

or

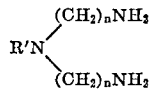

wherein R' is alkyl or alkenyl having from 8 to 22 carbon atoms, or mixtures thereof, and $n$ is 2 or 3, the mixing ratio of a:b being in the range of 1:9 to 7:3 parts by weight; and
   (III) the balance is water, as the continuous phase.

2. The emulsion of claim 1, wherein the mixing ratio of said monoamine salt $a$ to said triamine salt $b$ is 5:5 to 6:4 parts by weight.

3. The emulsion of claim 1, wherein said monoamine salt is selected from the group consisting of hydrochloric acid salts and acetic acid salts of octylamine, laurylamine, myristylamine, palmitylamine, stearylamine, oleylamine, tallowamine and behenylamine and said triamine salt is selected from the group consisting of hydrochloric acid salts and acetic acid salts of 1-tallowdipropylene-1,3,6-triamine, bisaminopropyloctylamine, 1-behenyldipropylene-1,3,6-triamine and bisaminopropylbehenylamine.

4. The emulsion of claim 1, wherein the emulsion contains 0.1 to 0.5 percent by weight of calcium chloride.

5. The emulsion of claim 1, wherein the emulsion contains from 0.1 to 10 percent by weight of additive selected from the group consisting of methyl cellulose, hydroxyethylcellulose, polyvinyl alcohol, polyethylene glycol, polyvinyl pyridine, polythiourea, polyoxyethylene alkylphenyl ether or mixtures thereof.

References Cited

UNITED STATES PATENTS

| 2,721,807 | 10/1955 | Rendall | 106—273 |
| 2,886,458 | 5/1959 | Ceintrey | 106—277 |
| 3,097,179 | 7/1963 | Ceintrey | 106—277 X |
| 3,126,350 | 3/1964 | Borgfeldt | 106—277 |
| 3,236,671 | 2/1966 | Dybalski et al. | 106—277 X |

FOREIGN PATENTS

| 1,106,236 | 5/1961 | Germany | 106—277 |
| 16,549 | 7/1968 | Japan | 106—277 |

JOAN B. EVANS, Primary Examiner

U.S. Cl. X.R.

94—20, 23; 106—278, 283, 202; 252—311.5